United States Patent Office 3,251,845
Patented May 17, 1966

---

3,251,845
PROCESS FOR OXIDIZING DIHYDROQUINACRIDONE TO QUINACRIDONEQUINONE
Edward E. Jaffe, Union, N.J., assignor to E. I. du Pont de Nemours and Company, Wilmington, Del., a corporation of Delaware
No Drawing. Filed Feb. 27, 1962, Ser. No. 176,088
5 Claims. (Cl. 260—279)

This invention relates to a new process for the preparation of quinacridonequinone and its substituted derivatives.

Quin(2,3b)acridine - 6,7,13,14(5,12H)tetrone, more commonly called quinacridonequinone, is a know compound which is used in the manufacture of commercial pigments. It has previously been prepared by the condensation of anthranilic acid with benzoquinone under the influence of suitable oxidizing agents, followed by cyclization under the influence of such dehydrating agents as concentrated sulfuric acid and the like. Another procedure which is disclosed for producing quinacridonequinone is in P.B. Report 70339, Frames 11311-13. This procedure involves the oxidation of quinacridone with sodium bichromate in acetic acid.

It is now found that quinacridonequinone can be prepared in good yield and in high purity by oxidizing a dihydroquinacridone to a quinacridonequinone according to the equation:

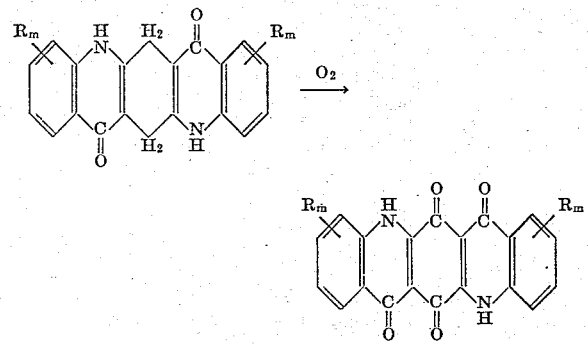

where R in both formulas is hydrogen, halogen, lower alkyl, or lower alkoxy, and m in both formulas is an integer of 1 to 2, inclusive. This oxidizing process comprises heating the above-described dihydroquinacridone at temperatures ranging from 80° C. to boiling in an acid medium containing an anion from the group consisting of the chromate ion, the permanganate ion, and the nitrate ion. Moreover, when the permanganate ion is used, it is possible to carry out the reaction in an alkaline medium.

A suitable acid medium for use in this invention is glacial acetic acid having the chromate ion therein as a result of the addition of chromic oxide to the acid. It is also possible to use a solution of sodium or potassium dichromate in acetic acid. Alternatively, an aqueous acid system can be used by employing sulfuric acid. The permanganate ion can be used in either an acid or an alkaline system. The acid system is much preferred since, in the alkaline system, by-product $MoO_2$ is formed and must be further reduced to a soluble manganous salt, usually by adding HCl with consequent chlorine gas evolution, for ready removal. Nitric acid provides a suitable oxidizing medium containing nitrate ions. If it is desired to produce a nitrated quinacridonequinone, concentrated nitric acid (50% or higher) may be used. Acids of less than 50% concentration can also be used and, if it is desired to insure that nitration will not take place, nitric acid of 15%–20% concentration should be used. However, the boiling point of the reaction must be increased by the use of pressure. A pressure sufficient to raise the boiling point to at least about 150° C. is sufficient to cause dilute nitric acid to convert dihydroquinacridone to quinacridonequinone.

The amount of acid or alkali used in the process of this invention may vary. When an acid medium is used, the pH should measure no greater than 2 during the reaction. It is preferred to use an amount of acid well in excess of that required to give a pH 2, but the exact amount is not critical. When an alkaline medium is used, the pH should measure at least 10 during the reaction. Also, it is preferred to use an amount of alkali well in excess of that required to give a pH 10, but here again the exact amount is not critical.

The amount of oxidizing agent used in each case must be at least the molar equivalent for the oxidizing reaction, and it is preferred that an excess of at least 100% be used. An excess beyond this amount serves no useful purpose, but there is no obvious restriction on its use.

The preferred temperature of reaction is at the boil or slightly below. This will be about 100° C. except for dilute nitric acid. As explained above, boiling at at least 150° C. should be effected with dilute $HNO_3$. Temperatures below the boil increase the time required for complete reaction. However, acceptable reaction rates can be obtained at 80° C. or higher when using an oxidizing medium containing the chromate or the permanganate ion.

The concentrations of the reactants in the oxidizing solution are limited only by the ability to be effectively stirred on the one hand and to have sufficient oxidizing agent to complete the reaction on the other hand. Within these limitations the concentrations are not at all critical.

Although unsubstituted dihydroquinacridone is a preferred reactant, it is obvious that substituted dihydroquinacridones can be reacted in the same manner. U.S. Patent 2,821,529 discloses a considerable number of substituted dihydroquinacridones, and any of these substituted derivatives can be used in the present invention. Examples of substituted dihydroquinacridones that could be used and the resulting quinacridonequinone include 2,9 - dimethyl-6,13 - dihydroquinacridone yields 2,9-dimethyl-quinacridonequinone; 4,11 - dimethyl-6,13-dihydroquinacridone yields 4,11 - dimethylquinacridonequinone; 4,11 - dichloro - 6,13 - dihydroquinacridone yields 4,11 - dichloroquinacridonequinone; 2,9 - dichloro - 6,13-dihydroquinacridone yields 2,9 - dichloroquinacridonequinone, 2,4,9,11 - tetrachloro - 6,13 - dihydroquinacridone yields 2,4,9,11 - tetrachloroquinacridonequinone, and 2,9 - dimethoxy - 6,13 - dihydroquinacridone yields 2,9 - dimethoxyquinacridonequinone. The specific details of the reaction are substantially the same as for the unsubstituted starting material. The procedure of Example VI could be used to react the above-mentioned quinacridones.

In a preferred embodiment of this invention, one part of 6,13-dihydroquinacridone is suspended in 10–40 parts (and preferably about 20 parts) of glacial acetic acid to which is then added about 2.5 parts of chromium trioxide ($CrO_3$) with just enough water to make a solution. Since the amount of water necessary to form a solution is very small, the acid medium may be characterized as substantially glacial acetic acid. The charge is then heated to the boil and maintained at the boil under reflux for 2 to 5 hours, after which it is cooled. The solid is then isolated by filtering, washed with water until acid free, and dried. In an alternative procedure, sulfuric acid may be used instead of glacial acetic acid.

For a clearer understanding of the invention, the following specific examples are given. These examples are intended to be merely illustrative of the invention and not in limitation thereof. Unless otherwise specified, all parts are by weight.

Example I 100 parts 6,13-dihydroquinacridone is added to 3000 parts of glacial acetic acid in a glass container equipped for external heating, for good agitation, and for reflux of the liquid on heating. 250 parts of chromium trioxide ($CrO_3$) dissolved in 500 parts of water is added over a 15-minute period and the charge heated slowly (about 30 minutes) to the boil. At about 80° C.–90° C. there is a brief exothermic reaction requiring caution in heating in this range, after which heating is continued to the boil and then under reflux for about 5 hours. The charge is cooled slightly and filtered, the residue washed acid free with water and dried to give 88 parts of brownish colored quinacridonequinone. This material is relatively pure but may be further purified by dissolving 26 parts in about 350 parts of concentrated $H_2SO_4$ at 8° C.–10° C., after which water is added cautiously with good agitation until the concentration of acid is reduced to about 80%, whereupon the sulfate of quinacridonequinone crystallizes from solution. It is isolated by filtration, washed with 75% $H_2SO_4$ and then hydrolyzed by adding it to an excess of ice and water, followed again by filtering, washing acid-free with water and drying to give about 20 parts of purified quinacridonequinone.

This product may be reduced in particle size by ball milling with sodium chloride. When the milled product is dispersed in an enamel vehicle, the resulting paint is a brownish gold which is especially attractive when metallized by the incorporation of aluminum or some other metallizing pigment. When mixed with several parts of a prime white pigment, as $TiO_2$, and dispersed in a vehicle, a very desirable reddish yellow hue is obtained.

Example II 9.42 parts of 6,13-dihydroquinacridone is dispersed in 100 parts of water to which is added 54 parts concentrated $H_2SO_4$ whereupon the temperature rises to about 60° C. 9 parts of $CrO_3$ dissolved in 10 parts of water is then added and the mixture heated to the boil and boiling continued under reflux for about 6 hours. After cooling somewhat, the solid is isolated by filtering, washing acid-free and drying to give 10.5 parts of brownish quinacridonequinone.

*Analysis.*—N—calculated for $C_{20}H_{10}N_2O_4$: 8.19%. N—found: 8.24%.

Example III 47 parts of 6,13-dihydroquinacridone is dispersed in a solution of 150 parts potassium permanganate ($KMnO_4$) in 600 parts of water to which is then added 300 parts of a 50% solution of NaOH in water (150 parts NaOH). The mixture is heated to the boil and maintained under reflux for about 5 hours, after which it is treated with an excess of concentrated HCl, until the brown $MnO_2$ is all dissolved (chlorine gas evolved). The solid is isolated in the usual way and found to be substantially pure quinacridonequinone (51 parts—100% yield).

Example IV

Potassium permanganate is more efficiently used as an oxidizing agent in acid solution. Thus, 79 parts of 6,13-dihydroquinacridone is dispersed in a solution of 360 parts concentrated $H_2SO_4$ in 750 parts of water. Then a solution of 105 parts $KMnO_4$ in 1500 parts of water is added slowly and the mixture heated at the boil under reflux for about 5 hours, followed by filtration, washing and drying of the resulting solid (78 parts) which is identified as substantially pure quinacridonequinone.

Example V 62.8 parts (0.2 mol) of 6,13-dihydroquinacridone is mixed with 500 parts (1.43 mols) of 18% nitric acid containing 0.25% sodium nitrate and the mixture is introduced into a stainless steel autoclave of suitable dimensions. All air is purged from the autoclave and replaced with helium. The autoclave is then heated to 210° C. and the helium pressure adjusted to about 400 p.s.i. whereupon 137 parts (0.87 mol) of 40% nitric acid is introduced under pressure over a one-hour period while maintaining the temperature at about 210° C. At the end of this heating period, the autoclave is cooled, the pressure vented, and the contents discharged. The resulting slurry is diluted with several volumes of water, filtered, washed acid-free and dried at 60° C. to give 66.3 parts (97% yield) of brownish quinacridonequinone which may be identified by comparison of the infrared spectrum with that of authentic quinacridonequinone and by the nitrogen analysis.

N—calculated for $C_{20}H_{10}N_2O_4$: N—8.19%. Found: N—8.41%.

Example VI 2,9-difluoroquinacridonequinone may also be prepared by the oxidation of the corresponding dihydroquinacridone. 10.5 parts of 2,9-difluoro-6,13-dihydroquinacridone is dispersed in 250 parts of glacial acetic acid to which is then added 24 parts of $CrO_3$ in 30 parts of water. The charge is heated to the boil and boiled about 6 hours under reflux. It is cooled, filtered, washed acid-free with water and dried to give 8.6 parts of 2,9-difluoroquinacridone.

The present invention represents a significant advance in the production of quinacrodonequinone. It is a process which produces a quinacridonequinone of very high purity. Moreover, the present invention has the advantage of eliminating the necessity for producing quinacridone and then converting it to quinacridonequinone. It will be seen from U.S. Patent 2,821,529 that the conversion of dihydroquinacridone to quinacridone requires a separate oxidizing step. Since the present process permits one to go directly from dihydroquinacridone to quinacridonequinone, the oxidizing step shown in the aforementioned patent is eliminated.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for oxidizing a dihydraquinacridone to a quinacridonequinone according to the equation:

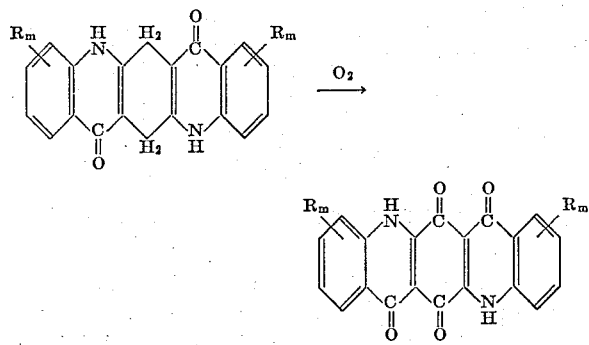

where R in both formulas is from the group consisting of hydrogen, halogen, lower alkyl, and lower alkoxy, and $m$ in both formulas is an integer of 1 to 2, inclusive, said process comprising heating said dihydroquinacridone at temperatures ranging from 80° C. to boiling in an acid medium containing an anion from the group consisting of the chromate ion, the permanganate ion, and the nitrate ion, with the further provision that the permaganate ion may be used in an alkaline medium.

2. The process of claim 1 in which the acid medium is substantially glacial acetic acid and the anion is the chromate ion.

3. The process of claim 1 in which the acid medium is sulfuric acid and the anion is the chromate ion.

4. The process of claim 1 in which the acid medium is sulfuric acid and the anion is the permanganate ion.

5. The process of claim 1 in which the quinacridone is unsubstituted dihydroquinacridone, the acid medium is substantially glacial acetic acid, and the anion is the chromate ion.

References Cited by the Examiner

UNITED STATES PATENTS 2,821,529   1/1958   Struve _____ 260—279

OTHER REFERENCES

Baczynski et al.: Ber. Deut. Chem., vol. 52B, pp. 461–84 (1919); abstracted in Chem. Abstr., vol. 13, pp. 2518–21 (1919).

Fierz-David et al.: "Fundamental Process of Dye Chemistry," Interscience, 1949, p. 225.

Fieser and Fieser: "Natural Products Related to Phenanthrene," 3rd ed., Reinhold, 1949; p. 233 relied on.

Groggins: "Organic Synthesis," 5th edition, p. 491, 1958.

Sharvin: Chem. Abstr., vol. 9, p. 3056 (1915).

United States Publications Board, Report 70339, Frames 11311–13, Oct. 26, 1935.

Wallace, J. C.: "Hydrogen Peroxide in Organic Chemistry," Du Pont, 1960.

NICHOLAS S. RIZZO, *Primary Examiner.*

DUVAL T. McCUTCHEN, IRVING MARCUS, WALTER A. MODANCE, *Examiners.*

DON M. KERR, DONALD G. DAUS,
*Assistant Examiners.*